United States Patent [19]

Kasahara et al.

[11] Patent Number: 4,971,141
[45] Date of Patent: Nov. 20, 1990

[54] JET STREAM INJECTION SYSTEM

[75] Inventors: Keisuke Kasahara, Tokyo; Toshio Aihara, Miyagi; Shigenao Maruyama, Miyagi, all of Japan

[73] Assignee: Kabushiki Kaisha Maekawa Seisakusho, Tokyo, Japan

[21] Appl. No.: 212,065

[22] Filed: Jun. 28, 1988

Related U.S. Application Data

[63] Continuation of Ser. No. 839,778, Mar. 14, 1986, abandoned.

[30] Foreign Application Priority Data

Mar. 22, 1985 [JP] Japan ................................ 60-58085

[51] Int. Cl.⁵ .............................................. F28C 3/10
[52] U.S. Cl. ........................... 165/104.14; 165/104.16; 34/57 A; 122/4 D
[58] Field of Search ............. 165/104.16, 104.14; 34/57 A; 122/4 D

[56] References Cited

U.S. PATENT DOCUMENTS

| | | | |
|---|---|---|---|
| 2,536,099 | 1/1951 | Schleicher | 34/57 A |
| 2,789,034 | 4/1957 | Swaine et al. | 34/57 A |
| 3,814,176 | 6/1974 | Seth | 165/104.16 |

FOREIGN PATENT DOCUMENTS 2105455  3/1983  United Kingdom ........... 165/104.16

*Primary Examiner*—Albert W. Davis, Jr.
*Attorney, Agent, or Firm*—Nilles & Nilles

[57] ABSTRACT

A jet stream injection device for use in a heat exchanger of a fluidized-bed type in which a flat jet stream is injected toward a heat transmission coil of the heat exchanger from below this coil so that is runs along said cell so as to form a mixed-phase flow of a gas and solid particles around the heat transmission coil. The jet stream injection device has a net with meshes smaller than the size of the particles of a fluidized bed provided over an opening provided on the upstream side of a jet stream generating slit-shaped injection port element. The opening has a larger passage sectional area than the injection port element.

2 Claims, 7 Drawing Sheets

FIG. 7
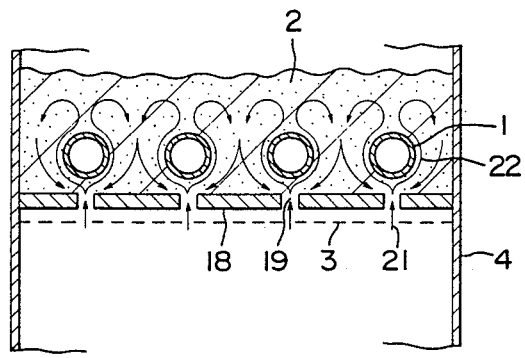
FIG. 8(a)  FIG. 8(b)
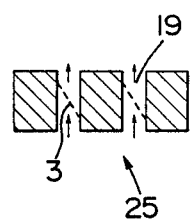 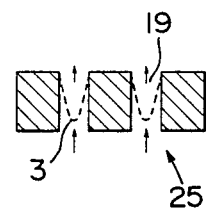
FIG. 9(a)  FIG. 9(b)
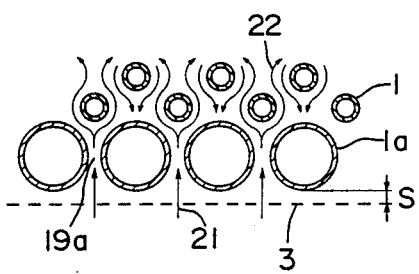 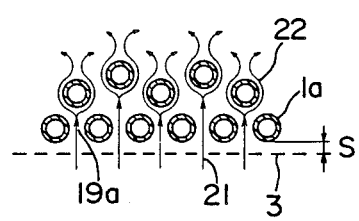

F I G. 11
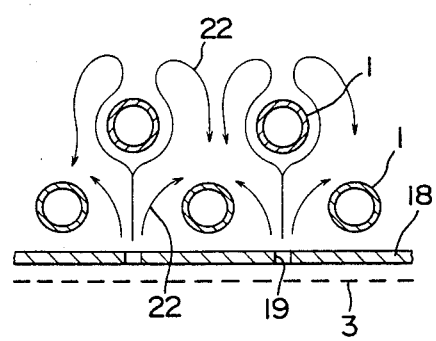
F I G. 12
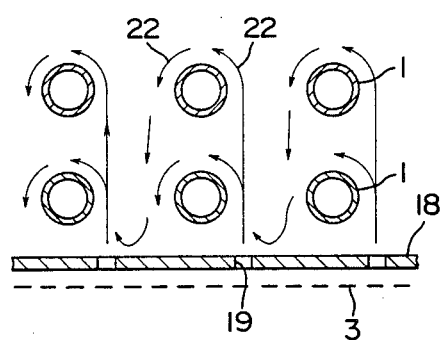
F I G. 13
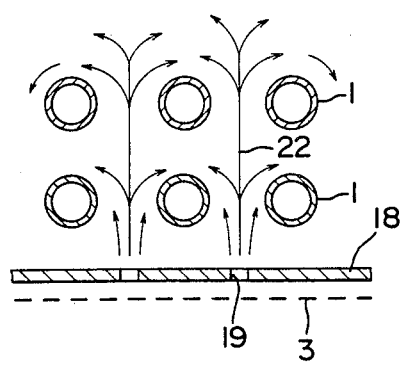

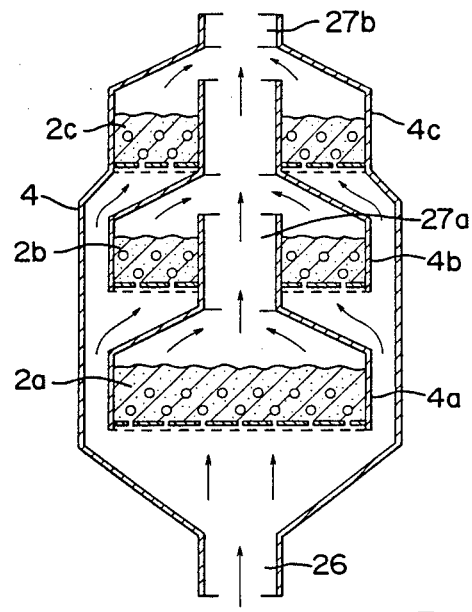
F I G. 14
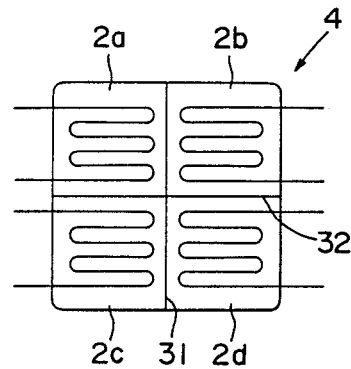
F I G. 15
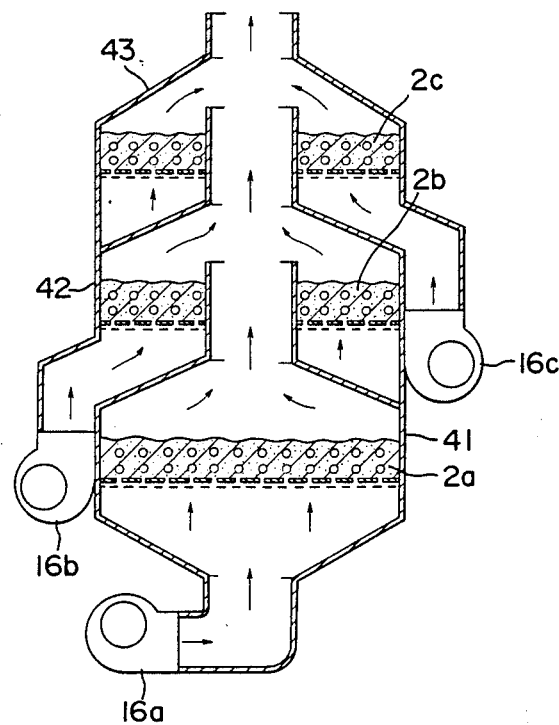
F I G. 16

FIG. 17
PRIOR ART
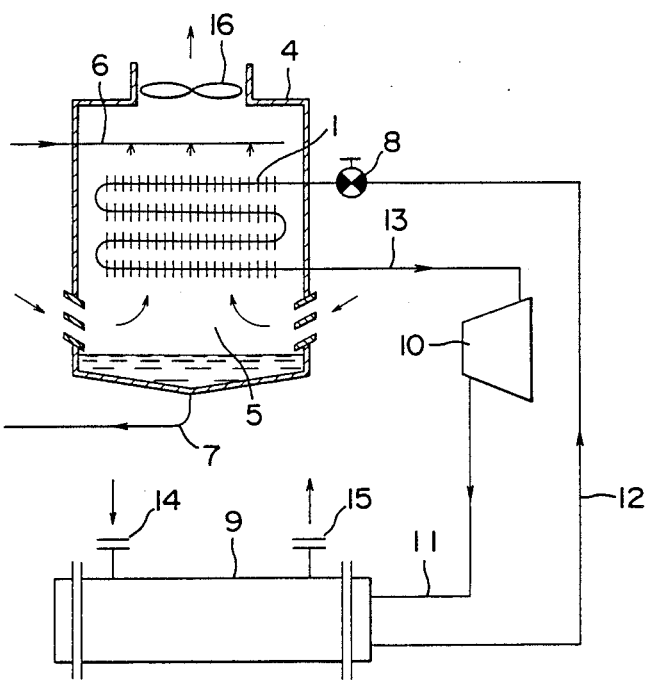
FIG. 18
PRIOR ART
FIG. 19
PRIOR ART
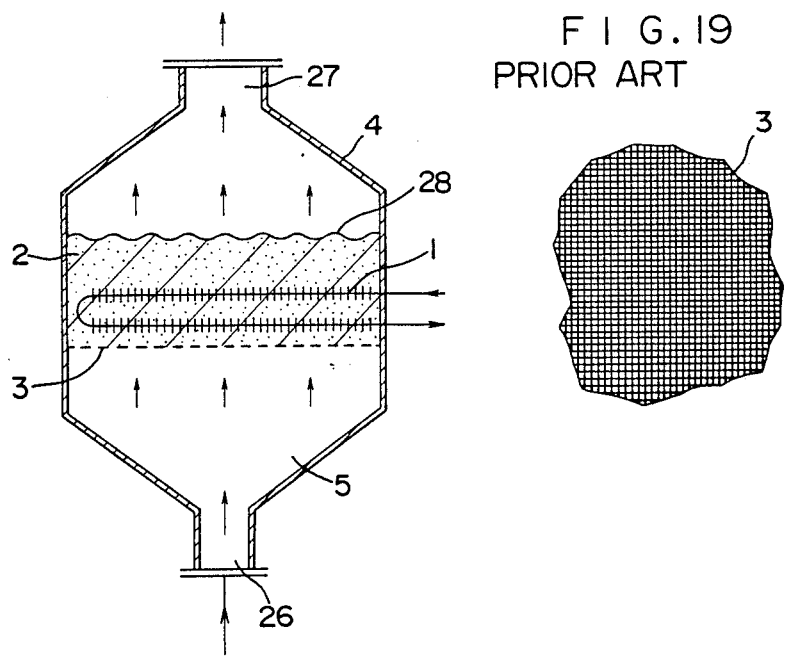

JET STREAM INJECTION SYSTEM

This application is a continuation of application Ser. No. 839,778, filed Mar. 14, 1986 now abandoned.

BACKGROUND OF THE INVENTION

1. Field of the Invention

The present invention relates to a jet stream injection system in a fluidized-bed type heat exchanger.

2. Description of the Prior Art

In most of prior-art systems, a fluid runs in a single-phase flow on a heat exchanging surface both in high-temperature heat exchange and low-temperature heat exchange when a heat exchanger is operated, and in many cases, fins are fitted on the heat exchanging surface so as to form a coil with fins, since the rate of heat transmission between the heat exchanging surface and the fluid (gaseous body) such as air is low. However, the coil with fins costs much to manufacture, and moreover an increase in a heat exchanging area is accompanied by a disadvantageous increase in the size of an apparatus. Furthermore, in an operation of the heat exchanger at low temperature, defrosting must be conducted frequently when frost is formed on an evaporator with fins, and the heat exchanger must be made large-sized, taking this operation into account, whereby the cost is further increased.

FIG. 17 illustrates one example of a priorart refrigeration or heat pump cycle. In the figure, numeral 4 denotes a casing of a heat exchanger of an air heat source type, 1 a heat transmission coil of the heat exchanger provided in said casing 4, i.e. an evaporator coil or a condenser coil each provided with fins, 10 a compressor, and 9 a heat exchanger (condenser and evaporator). When a cycle is made to operate as a heat pump, in other words, when the heat transmission coil 1 is made to operate as the evaporator coil, a refrigerant running from the compressor 10 to the heat exchanger (acting as the condenser) 9 through a discharge pipe 11 emits heat to a fluid flowing in an inlet 14 and out of an outlet 15 and is liquified. The liquefied refrigerant flows into the heat exchanger through an expansion valve 8, absorbs heat from the outside air sucked in through the lower part of the heat exchanger casing 4 by a far. 16, and is thereby evaporated and sucked again into the compressor 10 via a suction pipe 13. When frost is formed on the surface of the heat transmission coil of the heat exchanger, it is melted by a liquid (water) injected from a defrosting injection pipe 6, and the mixture water thus formed is gathered in a water tank positioned in the lower part and is discharged outside through a pipe 7. In some cases a defrosting system using a hot gas (not shown in the figure) is employed instead of the liquid injection defrosting system.

Although a flow of piping in the shifted direction in a refrigerating (cooling) system in which the element denoted by 1 operates as a condenser of an outside air heat source and the element denoted by 9 as an evaporator is not shown in this figure, the system shown herein can be made to operate both for a heat pump cycle and a refrigeration cycle.

It is also known publicly that the employment of a heat exchanger of a fluidized-bed type as a prior art makes excellent the efficiency of heat transmission when the heat exchanger operates at high temperature.

FIGS. 18 and 19 illustrate one example of a prior-art heat exchanger of the fluidized bed type, in which numeral 4 denotes a casing of the heat exchanger, and 1 a heat transmission coil of the heat exchanger provided in said casing 4, which is formed as a coil with fins. Numeral 2 denotes a fluidized bed. The fluidized bed 2 is formed in a space ranging from the position of the coil with fins to the position of a surface 28 sufficiently above, and it is constituted by particles (glass particles or the like) and supported in the aforesaid casing 4 by a net 3 with a mesh smaller than the size of said particles. A waste hot gas of high temperature flows in through an inlet 26, passes through the meshes of the net via an air chamber 5 and blows out through the entire region of the fluidized bed 2 from the lower part thereof, making the fluidized bed 2 be fluidized. A liquid (e.g. water) flowing through the heat exchanger 1 absorbs heat from the waste hot gas and the fluidized particles of high temperature through the solid-state contact of these substances with the coil of the heat exchanger, thus turning to be of high temperature. The waste hot gas flows out of an outlet 27.

The air chamber denoted by numeral 5 is provided for equalizing the distribution of the static pressure of air so as to make good a mixed-phase flow in the fluidized bed.

The waste hot gas blows out through the net 3 formed entirely of meshes (a minute-hole plate with a large number of holes distributed uniformly may also be employed), according to the above-stated prior art. On the other hand, the coil with fins of the heat exchanger extends in the longitudinal direction, and therefore it is hard to attain a stable and uniform fluidized state when the height of the fluidized bed is small, which tends to cause channeling (a phenomenon of blowing-through of an airflow) in a part of the fluidized bed 2.

This causes a fault that the heat transmission of the coil 1 turns nonuniform in time and space, which makes the coil inefficient. Therefore, the surface 28 of the fluidized bed 2 must be positioned high enough to enlarge the height of the bed, in order to make excellent the rate of heat transmission of the whole of the heat transmission coil of the heat exchanger, and this involves an increase in the blowing pressure of the waste hot gas and also an increase in power required therefor.

Moreover, defrosting must be conducted by a hot gas method or a liquid injection method when frost is formed on the heat exchanger in FIG. 17, and this operation produces a negative effect on the refrigerating capacity of a refrigerator or the heating capacity of a heat pump, causing also a time loss.

The present invention aims to eliminate the faults of the above-described prior art, which are summarized in the following.

The prior-art heat exchanger is provided with the coil with fins on the gas side thereof, and the gas side of the heat exchanger of this type is inferior in the rate of heat transmission, and thus it needs to be made large in size inevitably. Even with the fins provided, the apparatus needs to be made large in size, which causes a disadvantage of high cost. Although there is a method in which the heat of an exhaust gas or the like is collected by the heat exchanger of the fluidized-bed type under a high temperature, the pressure loss of the bed is large when the height of the fluidized bed is large, and thus an enormous power is required for a blower.

Moreover, while the heat transmission coil of the heat exchanger is disposed in the longitudinal direction, holes for injection of gas positioned under the coil are the meshes of a net or the minute holes made in a plate and are entirely uniform, and consequently the circulative movement of particles in the fluidized bed is not smooth and tends to be instable, which makes it difficult to improve the rate of heat transmission as expected. Therefore, the heat exchanging performance of the heat exchanger of this type is not improved so much as expected, although it is generally put to practical use. In the fluidized bed whose height is small, on the other hand, channeling tends to take place, and by this phenomenon of local blowing through, a gas to fluidize the particles is let to leak out in vain.

Defrosting of the heat transmission coil in the air type heat exchanger, which is conducted by using a hot gas or sprinkled water, causes the lowering of the refrigerating capacity of a refrigerator or the heating capacity of a heat pump, while causing a time loss. The growth of frost on an evaporator causes the lowering of the heating capacity of heat pump in winter, and this is the largest cause that prevents the heat pump heating from being used widely in cold districts, and it is the most serious fault of a heat pump for saving energy.

SUMMARY OF THE INVENTION

The present invention aims to eliminate such faults of the prior art as described above, and thereby to attain a jet stream injection system of high efficiency in which the channeling of the fluidized bed is prevented so as to form a fluidized state good in terms of space and time and thereby to increase the heat transmission effect of the fluidized bed, and in which the loss resulting from defrosting is eliminated while little pressure loss is caused when a jet stream is injected in the fluidized bed of a heat exchanger.

The jet stream injection system of the present invention is characterized in that: in a heat exchanger of a fluidized-bed type in which a flat jet stream is injected toward a heat transmission coil of said heat exchanger from below this coil so that it flows along the coil so as to form a mixed-phase flow of a gas and solid particles around the heat transmission coil, a net is provided in an opening which is positioned on the upstream side of a slit-shaped injection port element for generating a jet stream and has a flow channel of a larger sectional area than that of said injection port element, so as to remove the aforesaid faults of the prior art.

Moreover, the jet stream injection system of the present invention is characterized in that: in the aforesaid heat exchanger of a fluidized-bed type, a net is provided on the upstream side of a slit plate having a slit-shaped injection port element for generating a jet stream, and a gap between the lower side of said slit plate and said net is made small enough to prevent solid particles from remaining in said gap during the operation of the fluidized bed.

Furthermore, the jet stream injection system of the present invention is characterized in that: in the aforesaid heat exchanger of the fluidized-bed type, a net is provided in an injection port element of a member forming a slit-shaped injection port element for generating a jet stream, in such a manner that it is tilted to the flowing direction of the jet stream passing through said injection port element.

In addition, the jet stream injection system of the present invention is characterized in that: in the aforesaid heat exchanger of the fluidized bed type, each portion of the lowermost heat transmission coil is arranged with a small gap from other portion thereof so that a fluid passing through this gap may be formed into a jet stream, and a net is provided on the upstream side of the aforesaid lowermost heat transmission coil, while a gap between the lower side of said coil and said net is made small enough to prevent solid particles from remaining in the gap during the operation of the fluidized bed.

Since the jet stream injection system of the present invention is provided with the aforesaid means for eliminating the previously-described faults, it can operate or function in such a manner as described below.

A flat jet stream is injected toward the coil of the heat exchanger of the fluidized-bed type from under said coil so that it runs along the coil, and thereby a mixed-phase flow of a gas and solid particles is formed around the heat transmission coil so that the solid particles and the gas are in good contact with the surface of the coil.

After passing with little pressure loss through the net of the opening having a larger area than the injection port element for generating the jet stream, the stream is injected, in the form of the jet stream, from the slit-shaped injection port element positioned downstream.

Moreover, after passing through the net with little pressure loss, the stream is injected, in the form of the jet stream, from the slit-shaped injection stream side of the net with a small gap therefrom.

Furthermore, the stream passes to be injected, with little pressure loss, through the net provided obliquely in the injection port element of the member forming the slit-shaped injection port element.

In addition, after passing through the net with little pressure loss, the stream is injected, in the form of the jet stream, from gaps formed between the adjacent portions of the lowermost coil which are arranged with a gap between respectively.

According to the present invention, a heat exchanger having a high heat transmission coefficient can be attained by utilizing the action of the jet stream injected from the slit-shaped injection port member and the flow of the solid particles subsequent thereto, while the pressure loss of the stream tending much to occur in formation of the jet stream can be lessened.

When the present invention is applied to a heat exchanger of a heat pump cycle, the growth of frost on a heat exchanger (evaporator) of an outside air heat source type can be eliminated. Therefore a defrosting device can be omitted, and thus it is unnecessary to stop the operation of the system for defrosting. Consequently, the fear of frosting on the heat exchanger (evaporator) can be cleared away even in districts of severe winter, and accordingly, an economical heat pump can be employed even in such districts where it has not been used widely heretofore.

Moreover, the frost formed on the heat exchanger is scraped off constantly by the solid particles in the fluidized bed, and thus no frost can grow thereon. Therefore, no frosting can occur on the surface of the heat transmission coil and, in addition, neither dust nor scale can stick thereon, and thus the surface of the heat transmission coil can be kept in a polished state at all times. Accordingly, the effect of heat transmission can be maintained at a high level, and thus an expected effect of heat transmission can be produced sufficiently by a bare tube. Other purposes and characteristics of the present invention will be made apparent hereunder with the description of drawings.

BRIEF DESCRIPTION OF THE DRAWINGS

FIG. 7 is a partial sectional view of the lower part of a fluidized bed which is different from the one of FIG. 4;

FIG. 8 (a) and FIG. 8 (b) are partial sectional views of a third embodiment of the slit plate of the present invention;

FIG. 9 (a) and FIG. 9 (b) are partial sectional views different from the above of the lower part of the fluidized bed of the present invention;

FIG. 11 is a partial sectional view of the fluidized bed of another different embodiment of the present invention;

FIG. 12 illustrates one example of the fluidized bed of the present invention utilized as a multi-stage bed;

FIG. 13 illustrates one example of the fluidized bed of the present invention utilized in such a manner that a number of beds are juxtaposed;

FIG. 14 illustrates one example of the fluidized bed of the present invention utilized in such a manner that a heat exchanger casing in which the fluidized bed of the present invention is provided on a number of stages vertically;

FIG. 15 shows one example of a flow sheet diagram of a prior-art refrigeration or heat pump cycle;

FIG. 16 is a sectional view of a prior-art heat exchanger different from the one shown in FIG. 15; and FIG. 17 is a partial plan view of a net employed for the fluidized bed of FIG. 16.

DESCRIPTION OF THE PREFERRED EMBODIMENTS

Figure 1:
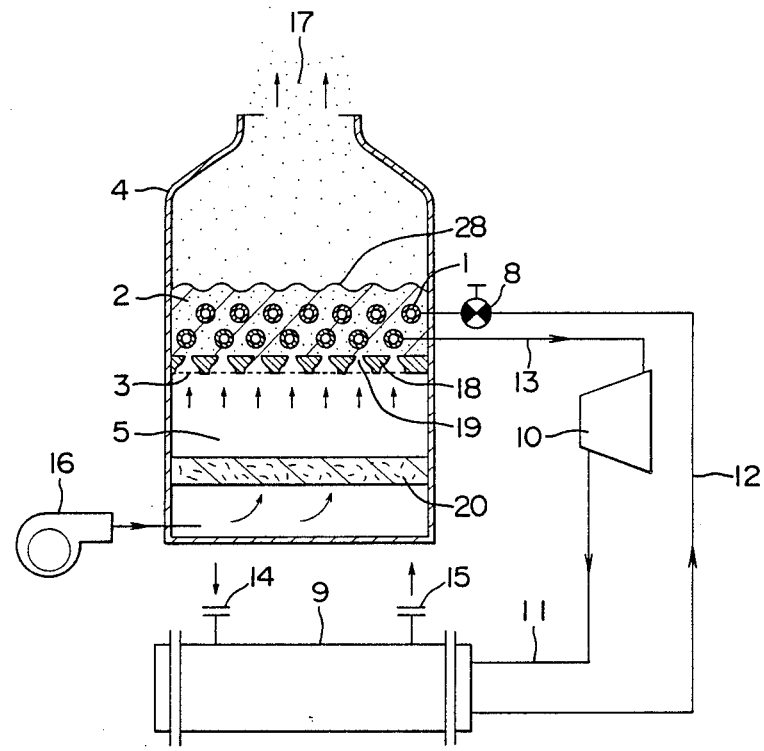
FIG. 1 shows one example of a flow sheet diagram of a heat exchanger provided with the system of the present invention, which is used for a refrigeration or heat pump cycle.

FIG. 1 shows one example of the present invention applied to a refrigeration or heat pump cycle, in which numeral 4 denotes a heat exchanger casing, and 1 a heat transmission coil of a heat exchanger provided in said casing 4. This coil is not provided with fins, but formed of a bare tube. Numeral 2 denotes a fluidized bed, 10 a compressor, and 9 a heat exchanger (condenser and evaporator). A cycle comprising the compressor 10, the heat exchanger 9, an expansion valve 8, and the coil 1, etc. operates in the same way as in the case of FIG. 17. Numeral 16 denotes a forced draft blower, 18 a slit plate, and 19 an injection nozzle. A fluid for cooling down a refrigerant flows into the heat exchanger (condenser) 9 through an inlet 14 and flows out through an outlet 15.

Figure 2:
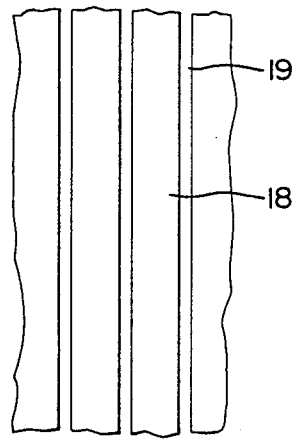
FIGS. 2 and 3 are partial plan views of injection nozzles provided in a slit plate of the present invention.
Figure 3:
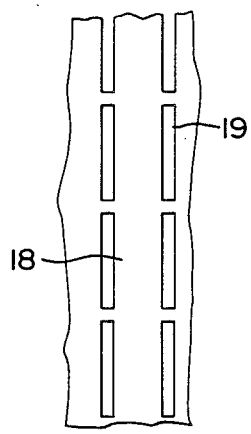
Figure 4:
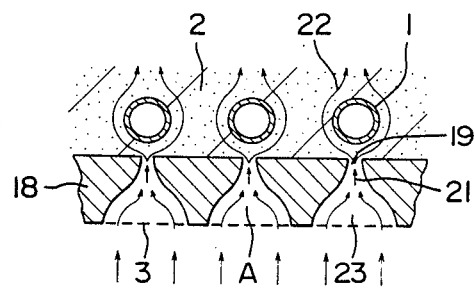
FIG. 4 is a partial sectional view of the lower part of a fluidized bed of FIG. 1.

When the cycle is made to operate as a heat pump, outside air of low temperature is made to pass through a dust removing filter 20 formed of a net with fine meshes and flow, as homogeneous static-pressure air, into an air chamber 5 by the blower 16, and then is blown out, as a jet stream, into the fluidized bed 2 from the injection nozzles 19 which are the slit-shaped openings of the slit plate 18. FIGS. 2 and 3 show examples of different structures of the injection nozzles 19 provided in the slit plate 18, and FIG. 4 illustrates the state of movement around the coil of the jet stream blown out into the fluidized bed 2 from the injection nozzles 19. The jet stream 21 is injected substantially from just below the heat transmission coil 1 of the heat exchanger to form a mixed-phase flow 22 along the circumference of the heat transmission coil so as to make good a convective heat transmission with the coil. In this embodiment, the pressure loss of the air stream can be reduced, since a net 3 is provided over an opening 23 having a larger passage sectional area than the injection nozzle 19.

Figure 5A:
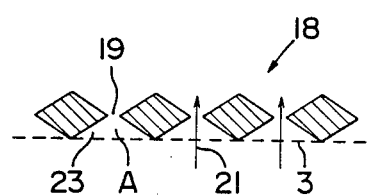
FIG. 5 (a) and FIG. 5 (b) are partial sectional views of one embodiment of the slit plate of the present invention.
Figure 5B:
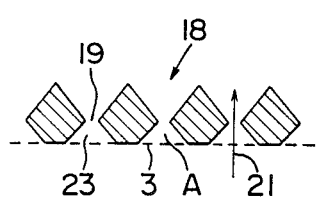

FIG. 5 (a) and FIG. 5 (b) are longitudinal sectional views of the slit plate 18 having different structures from that of FIG. 4. Since the net 3 is provided over the opening 23 having a larger passage sectional area than the injection nozzle 19, the pressure loss of the stream can be reduced, and that the upper surface of the slit plate 18 is formed by the aggregation of numerous slanting surfaces produces the following advantage. That is, while the solid particles which are not fluidized stay on the upper surface or the upper surface getting wet causes the formation of frost when said surface is flat as shown in FIG. 4, these faults, which occur in the case of FIG. 4, can be removed by forming this surface to be slanting as stated above.

Figure 6A:
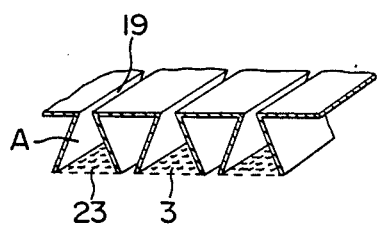
FIG. 6 (a) and FIG. 6 (b) are partial perspective views of a second embodiment of the slit plate of the present invention.
Figure 6B:
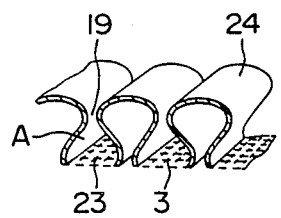
Figure 10A:
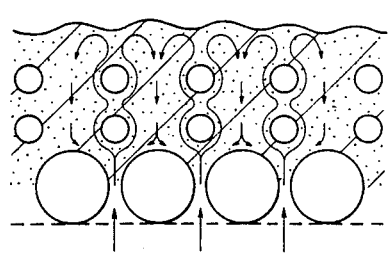
FIG. 10 (a) to FIG. 10 (e) are schematic illustrations of the states of a mixed-phase flow and/or a flow of solid particles which are brought about by various coil arrangement structures in the fluidized bed when the structures of the aforesaid embodiments are employed.
Figure 10B:
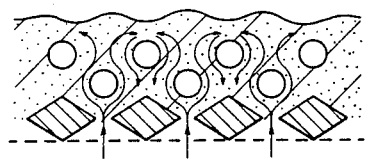
Figure 10C:
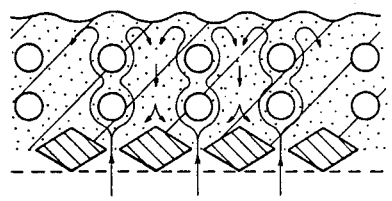
Figure 10D:
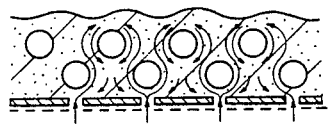
Figure 10E:
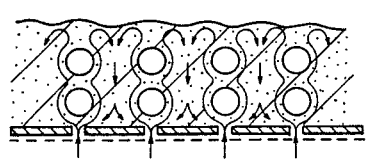
Figure 10F:
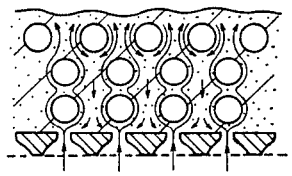
Figure 10G:
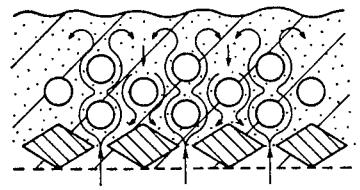

FIG. 6 (a) and FIG. 6 (b) show embodiments of the slit plate having different structures from that of FIG. 4. In these embodiments, the injection nozzle 19 is formed above and the opening 23 having a larger passage sectional area than said nozzle below by bending or curving a plate, and the opening 23 is provided with a net or a punched metal 3. The embodiment of FIG. 6 (a) is suitable for mass production, since it can be made of a flat plate, while the embodiment of FIG. 6 (b) is free from the solid particles staying on the upper surface 24, since it is made protuberant upward.

In the embodiments of FIGS. 4 to 6, a group of solid particles staying in a space A when the operation of the fluidized bed stops is fluidized and blown up when the operation of the system is started, and it flows out to a heat exchanging element through the injection nozzles 19. During the operation of the system, no solid particles return to the space A against a high-speed air stream injected from the part of the injection nozzles 19.

FIG. 7 shows an embodiment of the slit plate 18 having a different structure from that of FIG. 4. The injection nozzle 19 has the same structure as that of FIG. 2 or 3, and numeral 21 denotes a jet stream and 22 a mixed-phase flow of a gas and solid particles formed around the coil. The net 3 is provided on the upstream side a small gap apart from the lower surface of the slit plate 18, and said gap is made small enough to prevent the solid particles from remaining therein during the operation of the fluidized bed.

FIG. 8 (a) and FIG. 8 (b) show embodiments of a net provided in an injection port element respectively. Numeral 25 denotes a slit-shaped injection port element forming member for generating the jet stream, whose longitudinal section is shown, and 19 denotes the injection nozzle, while 3 denotes the net provided in the injection nozzle. In both embodiments of FIGS. 8(a) and 8 (b), the net is set in a direction inclined to the direction of the flow of the jet stream passing through the injection nozzle 19. According to this structure, the pressure loss can be reduced, since the jet stream flows through the net having a larger area than that provided, in the injection nozzle 19, at a right angle to the flowing direction of the jet stream passing through said nozzle.

FIG. 9(a) and FIG. 9 (b) show constructions in which, such a slit plate 18 as shown in FIG. 1 being omitted, the lowermost heat transmission coil 1a is formed so that the adjacent portions thereof are arranged with a small gap 19a between and that said gap itself is thus shaped into a slit by which a fluid passing through the gap is made to be a jet stream. A distance S between the net 3 and the coil 1a is selected appropriately to be small enough to prevent the solid particles from remaining in the aforesaid gap during the operation of the fluidized bed. FIG. 9 (a) shows the case in which the heat transmission coil 1a has a larger diameter than the heat transmission coil 1 on other stages, while FIG. 9 (b) shows the case in which the coil 1a has the same diameter as those on other stages.

FIG. 10 (a) to FIG. 10 (e) illustrate schematically the arrangement of the heat transmission coils on two stages and the state of a solid-gas mixed phase flow around the heat transmission coils in the above-described embodiments, respectively. By the adjustment of the speed of the air stream etc., such a state of the mixed-phase flow or the flow of solid particles as illustrated in the respective figure is formed around each heat transmission coil on each stage in accordance with the case in which the heat transmission coils are arranged above and below on the same vertical plane and the case in which said coils are arranged above and below in a zigzag form. FIG. 10 (a) to FIG. 10 (e) show the case in which the heat transmission coils are arranged on two stages.

Furthermore, the present invention can be embodied in the following manners.

While the adjacent portions of the lowermost heat transmission coil 1a are arranged with a small gap 19a between so that the gap itself is thus shaped in a slit and that a fluid passing through said gap is thereby formed into a jet stream in the construction of FIG. 9 (b), it is also possible, as shown in FIG. 11, that the gap between the adjacent portions of the lowermost heat transmission coil 1 is made to be equal to that of the upper heat transmission coil and that the slit plate 18 and the net 3 having the same structures as those in FIG. 7 are employed. Moreover, injection nozzles are provided in the slit plate 18 so that the jet stream is not injected toward the lower side of the lowermost coil 1, but injected toward the lower side of the coil 1 disposed on one stage above. This embodiment also produces an effect that a gas and solid particles are kept in good contact with the surface of each heat transmission coil 1, since a mixed-phase flow 22 of the gas and the solid particles is formed around this coil.

While the slit plate 18 and the net 3 employed in the embodiment of FIG. 11 has the same structure as that in FIG. 7, the same good heat transmission effect can be produced, of course, by adopting any one of the structures of FIGS. 2 to 6 for generating the jet stream, in place of the aforesaid structure.

As described above, the embodiment of FIG. 11 is an embodiment of the present invention equal to those of FIGS. 2 to 10 in that the mixed-phase flow of the gas and the solid particles is formed around the heat transmission coil by the injection of the jet stream and the gas and the solid particles are kept in a good contact with the surface of the coil, thus producing good heat transmission effects. In other words, the embodiment of FIG. 11, like those of FIGS. 2 to 10, has the construction in which a flat jet stream is injected toward the heat transmission coil from below the coil so that it runs along the direction of the coil, thereby causing the mixedphase flow of the gas and the solid particles around the heat transmission coil.

While a single fluidized bed is provided in the heat exchanger casing 4 in the embodiments described above, a plurality of fluidized beds disposed in a multistage manner can also be provided as shown in FIG 12. In this case, inner tubes 4a, 4b, 4c . . . are provided in said casing 4, and fluidized beds 2a, 2b, 2c . . . are formed inside the inner tubes respectively. A gas flowing in through an inlet 26 is separated into a part injected into the fluidized bed 2a and a part flowing between the walls of the casing 4 and the inner tube 4a, and the part of the gas making the fluidized bed 2a operate is discharged through outlets 27a, 27b . . . , the operation of each bed being conducted sequentially in such a process.

The capacity of the heat exchanger can be increased while an occupied space can be reduced by constructing the fluidized bed in multistage in this way.

FIG. 13 shows a construction in which the inside of the heat exchanger casing 4 is divided into four sections each forming a unit, by partition walls 31 and 32, each unit is provided with one of the fluidized beds 2a to 2d, and a gas sent by a common blower is made to flow separately into said fluidized beds 2a to 2d. The blower can be designed so that the speed of rotation thereof can be controlled, and a damper can also be provided at an inlet of air into the fluidized beds so as to enable a static pressure control.

In addition, it is also possible to install heat exchanger casings 41, 42 and 43 in vertical superposition and to make a gas flow into the respective fluidized beds 2a, 2b and 2c of the aforesaid casings by using separate blowers 16a, 16b and 16c respectively, as shown in FIG. 14.

When frost is formed even a little on the bare tube coil of the heat exchanger in FIG. 1 in the case where the present invention is used for a heat pump cycle, it is scraped down from the surface of the bare tube by the jet of the solid particles and the air stream in the fluidized bed which make a circulative movement constantly and violently, and it is mixed in the particles of the fluidized bed 2. Then, by a classifying (sizing) action of the fluidized bed 2, the frost smaller in specific gravity than the solid particle is brought upward sequentially through among the particles and separated from the solid particles to spring out into the air to be dispersed outside as tiny pieces 17 together with exhaust air.

The amount of frost formed on the coil depends on the temperature of the evaporator and that of a gas. When its amount becomes large, the size of the solid particles in the fluidized bed is enlarged in accordance with said amount and low degrees in temperature so as to promote the defrosting effect of the particles.

When the present invention is used for a heat exchanger of a cooling operation cycle, the heat exchanger operates as a condenser, and in summertime it operates as an air-cooled condenser. Since it is a condenser utilizing the fluidized bed having an excellent heat transmission coefficient, the radiation of heat into the outside air is facilitated remarkably, and the efficiency of a refrigeration cycle can be improved by lowering the temperature of condensation of a refrigerant. The heat exchanger operates as an evaporator in the above-described heat pump operation. Since the difference between the temperature of evaporation of the refrigerant and the fluid temperature of the fluidized bed on the occasion can be made small, the temperature of evaporation can be set at high degrees, and thus the efficiency of the heat pump cycle can be improved.

What is claimed is:

1. Heat exchange apparatus comprising:
   a casing (4) having chamber means therewithin and inlet port means and outlet port means communicating with said chamber means;
   means comprising a common blower for supplying pressurized gas through said inlet port means;
   and a plurality of fluidized-bed type heat exchangers located in said chamber means and arranged one above another, each communicating directly with and receiving pressurized gas from said inlet port means and each communicating directly with and discharging gas from its respective bed through said outlet port means, each fluidized-bed type heat exchanger comprising:
   a bed of flowable solid particles;
   at least one elongated tube located entirely within said bed;
   means in said chamber means below said bed defining at least one injection port for receiving pressurized gas from said inlet port means and having a slit-shaped injection nozzle for injecting a flat jet stream of gas into said bed toward said tube so that a mixed-phase flow of said gas and said particles is formed around said tube, said gas subsequently flowing through said bed and into said chamber means for discharge through said outlet port means;
   and net means in said chamber means upstream of said injection nozzle for supporting said bed.

2. Heat exchange apparatus comprising:
   a casing (4) having chamber means therewithin and inlet port means, including a plurality of inlet passages, and outlet port means communicating with said chamber means;
   means comprising a plurality of blowers for supplying pressurized gas through said inlet passages of said inlet port means;
   and a plurality of fluidized-bed type heat exchangers located in said chamber means and arranged one above another, each communicating directly with and receiving pressurized gas from an inlet passage of said port means which is supplied from a blower and each communicating directly with and discharging gas from its respective bed through said outlet port means, each fluidized-bed type heat exchanger comprising:
   a bed of flowable solid particles;
   at least one elongated tube located entirely within said bed;
   means in said chamber means below said bed defining at least one injection port for receiving pressurized gas from a respective inlet passage of said inlet port means and its associated blower and having a slit-shaped injection nozzle for injecting a flat jet stream of gas into said bed toward said tube so that a mixed-phase flow of said gas and said particles is formed around said tube, said gas subsequently flowing through said bed and into said chamber means for discharge through said outlet port means;
   and net means in said chamber means upstream of said injection nozzle for supporting said bed.

* * * * *